United States Patent
Smith

(10) Patent No.: US 10,360,278 B2
(45) Date of Patent: Jul. 23, 2019

(54) SYSTEM AND METHOD FOR ACCESSING ONLINE CONTENT

(75) Inventor: Darren C. Smith, Sammamish, WA (US)

(73) Assignee: Nintendo of America Inc., Redmond, WA (US)

(*) Notice: Subject to any disclaimer, the term of this patent is extended or adjusted under 35 U.S.C. 154(b) by 0 days.

(21) Appl. No.: 13/093,036

(22) Filed: Apr. 25, 2011

(65) Prior Publication Data

US 2011/0307787 A1    Dec. 15, 2011

Related U.S. Application Data

(60) Provisional application No. 61/344,227, filed on Jun. 15, 2010.

(51) Int. Cl.
*G06F 3/048* (2013.01)
*G06F 16/955* (2019.01)

(52) U.S. Cl.
CPC .................. *G06F 16/9566* (2019.01)

(58) Field of Classification Search
CPC ............ G06F 3/0484; G06F 3/04886; G06F 3/04897; G06F 17/30887; G06F 3/0481; G06F 3/04812; G06F 3/0482; G06F 3/16; G06F 3/167; G06F 17/30879; G06F 16/9566; G06Q 30/02; G06Q 20/208; G06Q 30/0601; G06Q 30/0641; H04L 67/02; H04N 21/4622; H04N 21/4782
USPC ................... 715/205–208, 716, 727–729
See application file for complete search history.

(56) References Cited

U.S. PATENT DOCUMENTS

| | | | |
|---|---|---|---|
| 6,636,896 B1 * | 10/2003 | Philyaw | G06F 17/30876 707/E17.032 |
| 6,947,571 B1 * | 9/2005 | Rhoads et al. | 382/100 |
| 7,158,618 B1 * | 1/2007 | Kusuda et al. | 379/88.17 |
| 8,725,838 B2 | 5/2014 | Bezos | |
| 2002/0185532 A1 * | 12/2002 | Berquist et al. | 235/385 |
| 2003/0018541 A1 * | 1/2003 | Nohr | 705/26 |
| 2003/0066089 A1 * | 4/2003 | Andersen | H04H 20/28 725/112 |
| 2003/0126461 A1 | 7/2003 | Barker et al. | |
| 2004/0103043 A1 * | 5/2004 | Reade et al. | 705/27 |
| 2004/0132431 A1 * | 7/2004 | Vandermeijden et al. | 455/412.2 |
| 2005/0114154 A1 * | 5/2005 | Wolkowicz et al. | 705/1 |
| 2005/0147256 A1 * | 7/2005 | Peters et al. | 381/56 |

(Continued)

FOREIGN PATENT DOCUMENTS

EP    1 213 646        6/2002
EP    1 739 925 A1    1/2007

(Continued)

OTHER PUBLICATIONS

International Search Report for PCT/US2011/040469, dated Nov. 21, 2011.

(Continued)

*Primary Examiner* — Renee D Chavez
*Assistant Examiner* — Jianmei F Duckworth
(74) *Attorney, Agent, or Firm* — Nixon & Vanderhye, P.C.

(57) ABSTRACT

An example method of accessing a web page includes receiving audio output from speakers of electronic equipment; detecting a cue in the received audio output; determining a web address based on the detected cue; and connecting to a web page using the web address.

13 Claims, 8 Drawing Sheets

(56) References Cited

U.S. PATENT DOCUMENTS

| | | | |
|---|---|---|---|
| 2005/0219068 A1* | 10/2005 | Jones et al. | 341/50 |
| 2005/0222846 A1* | 10/2005 | Tomes | H04L 12/66 704/275 |
| 2006/0168644 A1* | 7/2006 | Richter et al. | 726/2 |
| 2006/0281543 A1* | 12/2006 | Sutton et al. | 463/29 |
| 2007/0120679 A1* | 5/2007 | Shin et al. | 340/572.7 |
| 2007/0155307 A1 | 7/2007 | Ng et al. | |
| 2007/0162350 A1 | 7/2007 | Friedman | |
| 2008/0125174 A1 | 5/2008 | Kim | |
| 2009/0014511 A1* | 1/2009 | Morita | 235/375 |
| 2009/0037949 A1* | 2/2009 | Birch | 725/34 |
| 2009/0144775 A1 | 6/2009 | Rosin et al. | |
| 2010/0006646 A1* | 1/2010 | Stiller | 235/383 |
| 2010/0013603 A1* | 1/2010 | Chatani et al. | 340/10.6 |
| 2010/0088100 A1* | 4/2010 | Lindahl | G10L 15/30 704/270.1 |
| 2010/0146115 A1 | 6/2010 | Bezos | |
| 2011/0276961 A1* | 11/2011 | Johansson et al. | 717/178 |
| 2012/0132701 A1* | 5/2012 | Nakagawa et al. | 235/375 |

FOREIGN PATENT DOCUMENTS

| | | |
|---|---|---|
| JP | 2004-355308 | 12/2004 |
| JP | 2007-121626 A | 5/2007 |
| JP | 2008-310548 A | 12/2008 |
| JP | 2009 159592 A | 7/2009 |
| KR | 10-2006-0064709 | 6/2006 |
| KR | 10-2010-0047718 | 5/2010 |
| WO | 01/13634 | 2/2001 |
| WO | 01/15018 | 3/2001 |
| WO | 2006-006767 | 1/2006 |

OTHER PUBLICATIONS

Written Opinion of the International Searching Authority for PCT/US2011/040469, dated Nov. 21, 2011.
Supplementary European Search Report dated Oct. 29, 2013 in counterpart EP Application No. 11798647.
Japanese Office Action in corresponding JP 2013-515472 dated May 12, 2015.
Final Rejection in Japanese Application No. 2013-515472 dated Sep. 1, 2015.

* cited by examiner

| CUE 1 | http://www.greatestcarever.com |
|---|---|
| CUE 2 | http://www.greatestcleanerever.com |
| CUE 3 | http://www.greatesttoyever.com |
| ⋮ | ⋮ |
| CUE N | http://www.greatestgiftever.com |
Fig. 3
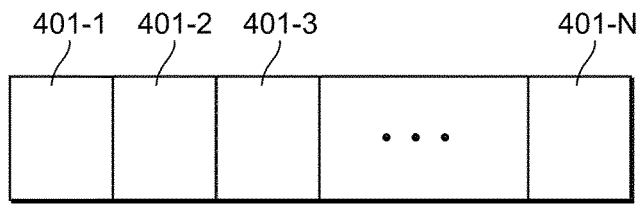
Fig. 4A
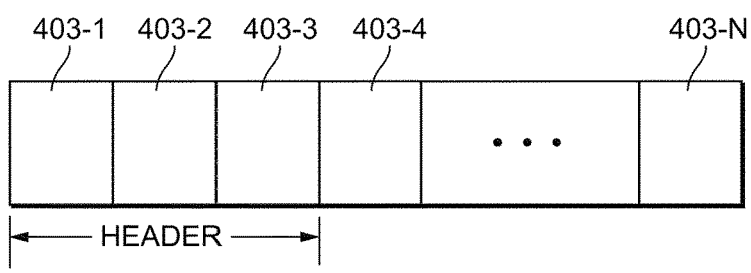
Fig. 4B
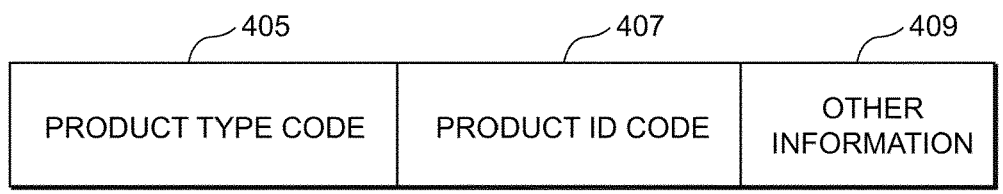
Fig. 4C

NON-LIMITING
EXAMPLE VIDEO GAME SYSTEM 50

NON-LIMITING EXAMPLE
BLOCK DIAGRAM OF VIDEO GAME
CONSOLE 500

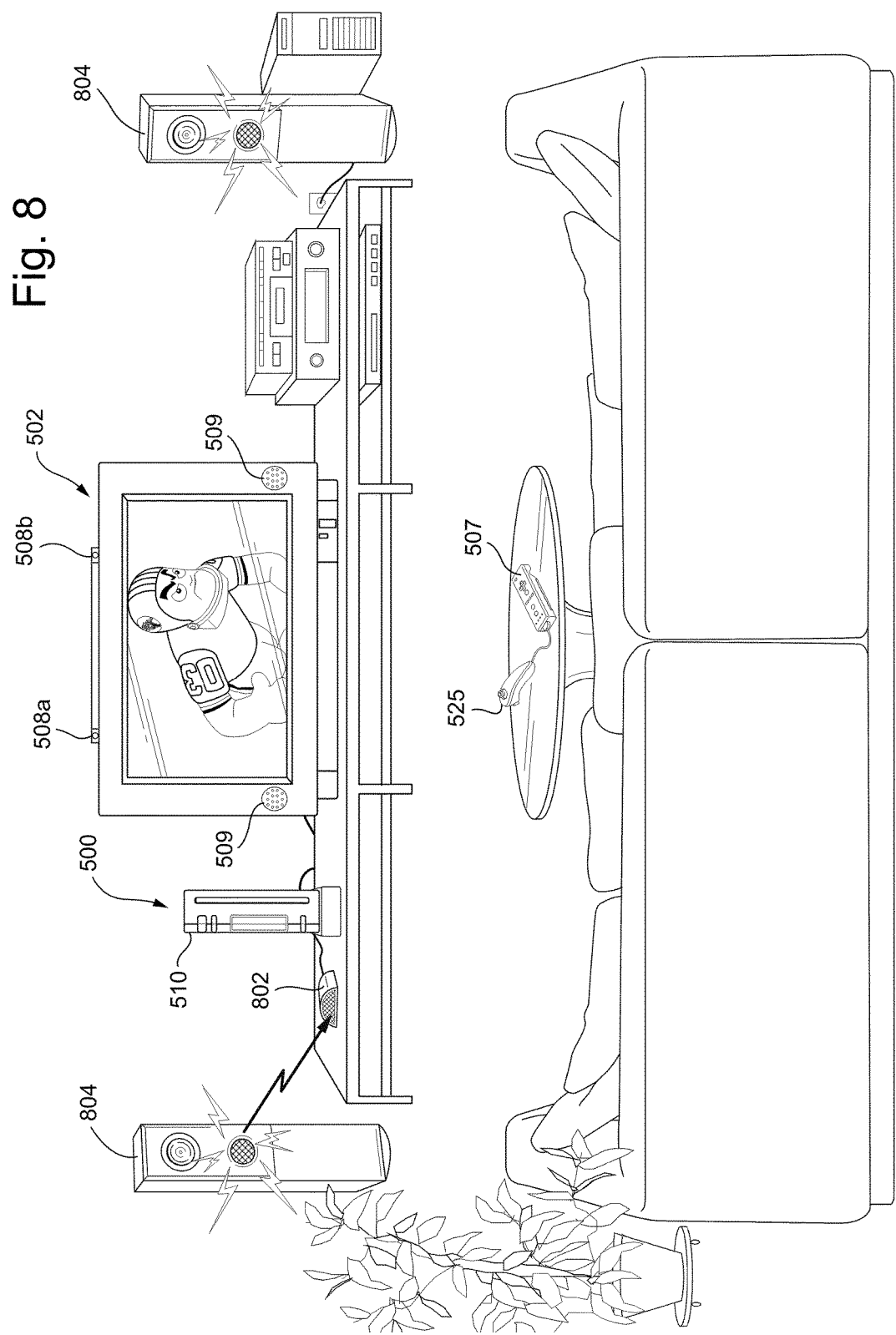

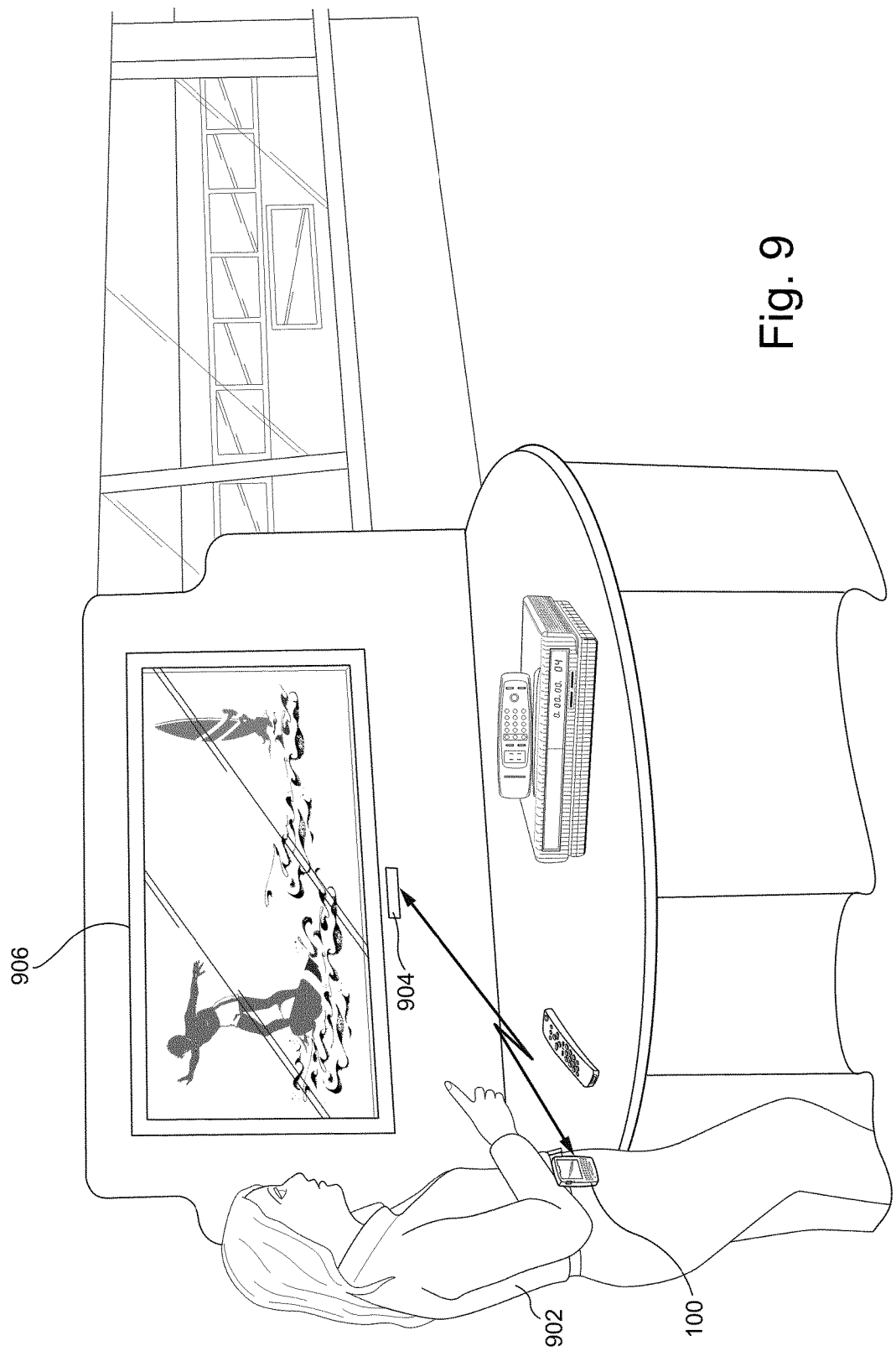

SYSTEM AND METHOD FOR ACCESSING ONLINE CONTENT

CROSS-REFERENCE TO RELATED APPLICATION

This application claims the benefit of provisional application No. 61/344,227, filed Jun. 15, 2010.

BACKGROUND AND SUMMARY

The systems and methods described herein relate to accessing online content by, for example, using detected cues.

The internet contains vast amounts of information. The systems and methods described herein facilitate presentation of online content to users.

BRIEF DESCRIPTION OF THE DRAWINGS

FIG. 3 shows a table that associates cues and web sites.

FIGS. 4A-4C show examples of cues.

FIG. 8 shows an example system for detecting audio cues.

FIG. 9 shows another example system for detecting audio cues.

DETAILED DESCRIPTION OF EXAMPLE EMBODIMENTS

The example systems and methods described herein can be used to present content of interest to users. In one example, the systems and methods use cues to control a web browser to load web pages. These web pages may relate to products or services in a television program or commercial being watched or in a song, radio program or commercial being listened to. For example, a cue contained in a television program being watched can be detected to cause a web browser to load a web page with additional information about the program, the actors or actresses, etc. or with products related to the program (e.g., DVDs of prior programs, books relating to the program, etc.). Similarly, a cue contained in a song being listened to can be detected to cause a web browser to load a web page from which the song or other songs by the same artist can be downloaded.

The cues are not limited to audio cues. For example, RFID tag information from products in a store can be detected and used as cues to load web pages containing further information about the tagged products. For example, a portable or handheld system can be carried in a store and RFID tag information can be detected as cues from products in the store. The detected RFID cue can cause a web browser running on the system to load a web page containing additional information about the product.

The detected cues need not immediately cause the web page to be loaded. For example, web page information (e.g., a web address) for a cue may be stored in a memory of the system and a user can later choose whether or not to load the web page. If web page information for multiple web pages is stored in the memory, a list of web pages can be presented to the user and the user can select can, for example, select particular web pages from the list for viewing.

Detected cues may also be used to find or access content on the system itself. For example, in the context of a video game system, a cue detected while a particular television program is being watched may be used to unlock a new level of game play, introduce a new character into the game, allow use of certain weapons and tools and the like.

Figure 1:
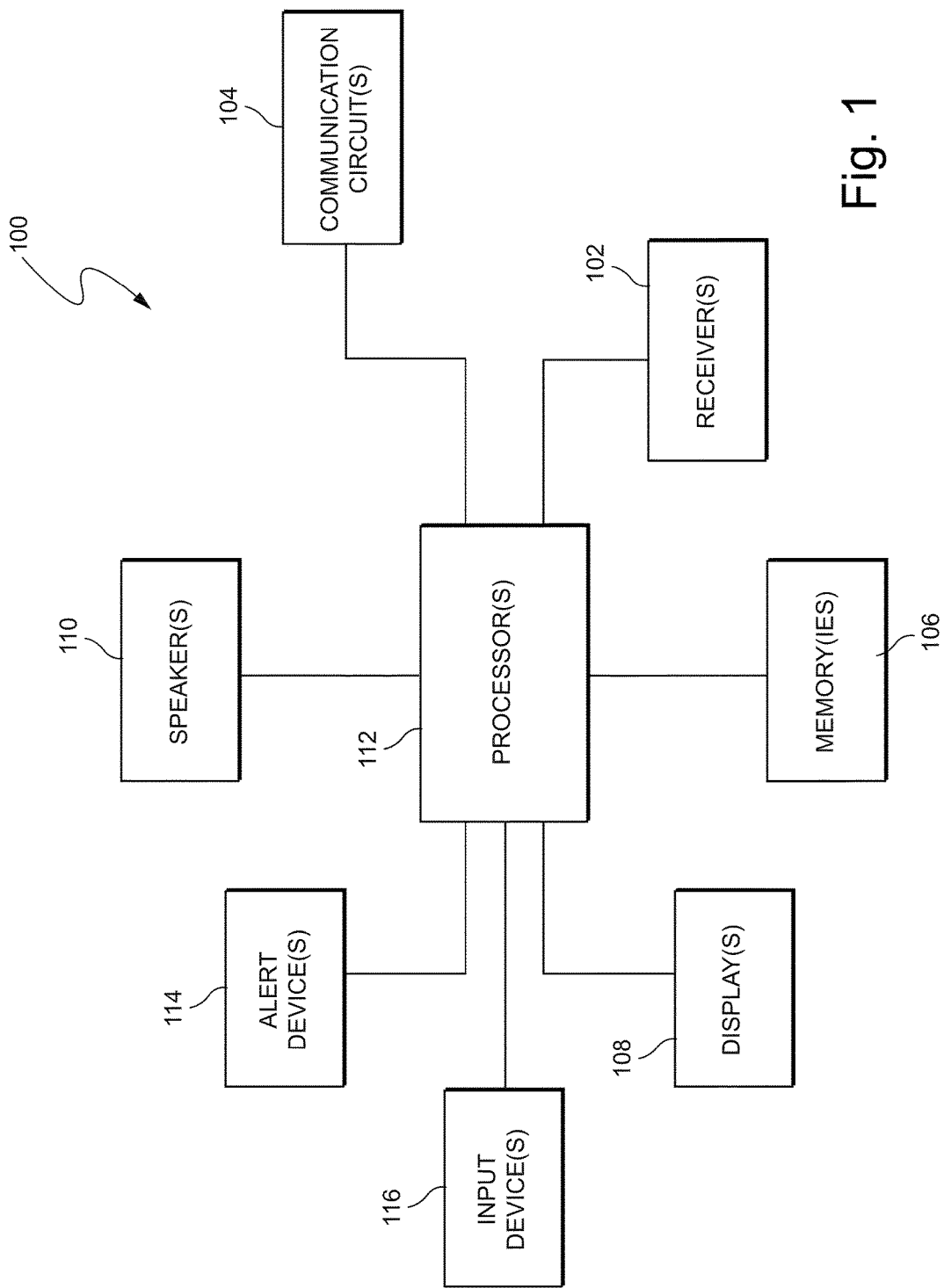
FIG. 1 is a generalized block diagram of an example system.

FIG. 1 is a generalized block diagram of an example system 100 that uses cues to display content of interest to a user. Although FIG. 1 shows various blocks each separately connected to processor, it will be appreciated that some or all of the components shown in FIG. 1 may be connected in common to one or more buses.

System 100 may be provided as an integral unit such as a handheld video game system, a personal digital assistant (PDA), a telephony-enabled PDA, a cellular telephone, a smartphone, and the like. System 100 may also be provided as a console unit such as a video game console which does not itself include a display or speakers, but connects via suitable connectors to an output device such as a television, a monitor or the like.

System 100 includes one or more receivers 102 for receiving signals containing cues from the ambient environment or surroundings in which the system is located.

If the system is implemented as a video game console, the ambient environment may be the family room or living room of a house or apartment and the cues may include audio cues contained in the output of electronic equipment such as speakers for a television, a radio, stereo equipment, etc. in the vicinity of the system. In this case, receiver 102 may be one or more microphones built into or connected to the console in a wired or wireless manner. These audio cues may, for example, be of relatively short duration (e.g., up to several seconds) and at a frequency which is high enough or low enough to not significantly interfere with the user's viewing of a television program or commercial or with the user's enjoyment of a song playing on the radio (e.g., less than about 20 Hz or greater than about 20 kHz). The cues may be periodically inserted into the audio portion of a movie, television program, song, or commercial and may vary in accordance with the content of the movie, program, song, or commercial. Thus a first cue in a commercial for an automobile may correspond to a web site or web page providing additional information about the automobile and a different, second cue in a subsequent commercial for a computer product may correspond to a different web site or web page providing information about the computer product.

If the system is implemented as a handheld video game system, the ambient environment or surroundings may be any place or location into which the handheld system is carried. For example, the handheld video game system may be carried into stores and the cues may include audio cues included in music or announcements played over speakers in the store.

Other cues may be provided by RFID information from RFID tags attached to products in a store, for example. In this case, receiver 102 is an RFID reader, which may be built into or provided as an attachment to a handheld implementation of system 100.

Communication circuit 104 enables system 100 to be connected to a communication network such as the internet.

Communication circuit 104 may, for example, be a wireless module (such as a WiFi module) that allows the system to connect to the internet via an access point located in the vicinity of the system 100. If system 100 is implemented as a smartphone or cellular telephone, communication circuit 104 may be mobile telephony circuitry that allows the system to connect to a base station of a mobile telephone system using mobile phone technology (e.g., CDMA, GSM, GPRS, etc.). Other types of communication circuits may be used and multiple communication circuits may be included in the system such as for mobile phone communications, WiFi and Bluetooth.

Memory 106 stores operating programs, applications, data, etc. used by system 100. Memory 106 may be a combination of volatile and non-volatile memory. For example, a program for implementing the various operations of the systems and methods described herein may be stored in nonvolatile flash memory and loaded into RAM for execution by processor 112.

System 100 also includes one more displays 108 and one or more speakers 110. Displays 108 may be LCD, LED, FED, SED, plasma, or CRT type displays.

Processor 112 controls the overall operation of the system. Processor 112 may include one or more of a microprocessor, a microcontroller, a microcomputer, and the like. For example, in response to inputs supplied to system 100, processor 112 controls the loading of a selected program (e.g., stored in flash memory) into RAM and then executes the program.

System 100 may also include one or more alert device 114 that provides an alert or indication that the system is loading a web page in response to detection of a cue. Alert device 114 may provide one or more of a tactile, audible or visual alert. For example, alert device 114 may include a vibration circuit that provides a vibration (tactile) alert when a web page is loaded in response to detection of a cue. The vibration or pattern of vibration may be different than the vibration or vibration pattern used to provide other alerts, such as an incoming call or email in the case of a smartphone. In the case of system 100 being provided as an integral unit, the vibration may be applied to the housing of the unit itself. In the case of system 100 being provided as a console unit, the vibration may be applied to an accessory such as a remote control. As another example, alert device 114 may include one or more lights which may be flashed to provide an alert that when a web page is loaded in response to detection of a cue. The flashing or pattern of flashing may be different than the flashing or flash pattern used to provide other alerts, such as an incoming call or email in the case of a smartphone. In the case of system 100 being provided as an integral unit, the lights may be provided on the housing of the unit itself. In the case of system 100 being provided as a console unit, the lights may be provided on the housing of the console or on an accessory such as a remote control. As yet another example, speakers 110 may be used as an alert device to provide a sound that provides an alert when a web page is loaded in response to detection of a cue. The sound may be different than the sound used to provide other alerts, such as an incoming call or email in the case of a smartphone. In the case of system 100 being provided as an integral unit, the speaker(s) providing the alert may be provided on the housing of the unit itself. In the case of system 100 being provided as a console unit, the speaker(s) may be provided on the close unit or on an accessory such as a remote control.

System 100 may be disposed in a living room, for example, and can monitor ambient audio output from electronic equipment (e.g., via speakers) in the living room. In this case, receiver 102 is a microphone, for example. The microphone receives the ambient audio and processor 112 detects audio cues in the received audio that indicate, for example, that TV advertising is being displayed or radio advertising is being played in the vicinity of the system. Upon detecting a cue, processor 112 uses the detected cue to determine website information (e.g., a web address or uniform resource locator) corresponding to the cue. This may be accomplished by referencing a database or table that relates cues to website information. Such a database may be maintained on a website, for example, in which case processor 112 controls system 100 to access the website and use the cue to obtain the corresponding website information. Such a database may also be maintained locally in memory 106 of system 100 controls the system to access the internet and launch a browser which is directed to a web page related to the product or service being advertised. The web page is displayed on display 108.

Alternatively, system 100 could simply collect the data about the advertiser and store the information in memory 106. The next time the user accesses the internet, he or she is given an option to view the specific pages for the ads corresponding to the cues previously detected using the microphone.

In the first configuration, some alert (audible, visual or tactile) can provide the user some indication that the system has accessed a web page so that the user is alerted to the operation of the system.

The data collection can also be performed by a handheld device such as a handheld video game system, a cellular phone, a personal digital assistant and the like. A program running on the handheld device collects audio cues via a microphone which may be built into the handheld device or connected by a wired or wireless connection (e.g., WiFi, Bluetooth, etc.) to the handheld device.

In the example, companies could create audio advertising that includes embedded audio cues. For example, a department store could create an audio track that they play in their stores that includes these audio cues. The handheld device would log any advertising cues it detects while the user is walking through the store. The user could then synchronize the handheld device to system 100 (or this could be done automatically when the handheld device and game console are within proximity of each other), and the handheld could deliver the data about the advertising cues that it encountered since the last time of synchronization. The system could then act upon these cues, as in the first and second configurations above.

For the handheld device, the "cues" could also be detected using an RFID accessory that could detect product information embedded in products that the user spends time near. The products could be sorted by the amount of time spent in proximity of a product with an RFID tag embedded in it. For example, a user might go to a bookstore and look at many books, each of which has an RFID tag embedded in it. The handheld device would passively note the tag IDs of the books that the user spent time near, and the amount of time spent near them, and when returning home, the user could see the list of books on the game console, and be able to purchase those books via an online bookstore, or add them to a wish list.

Figure 2:
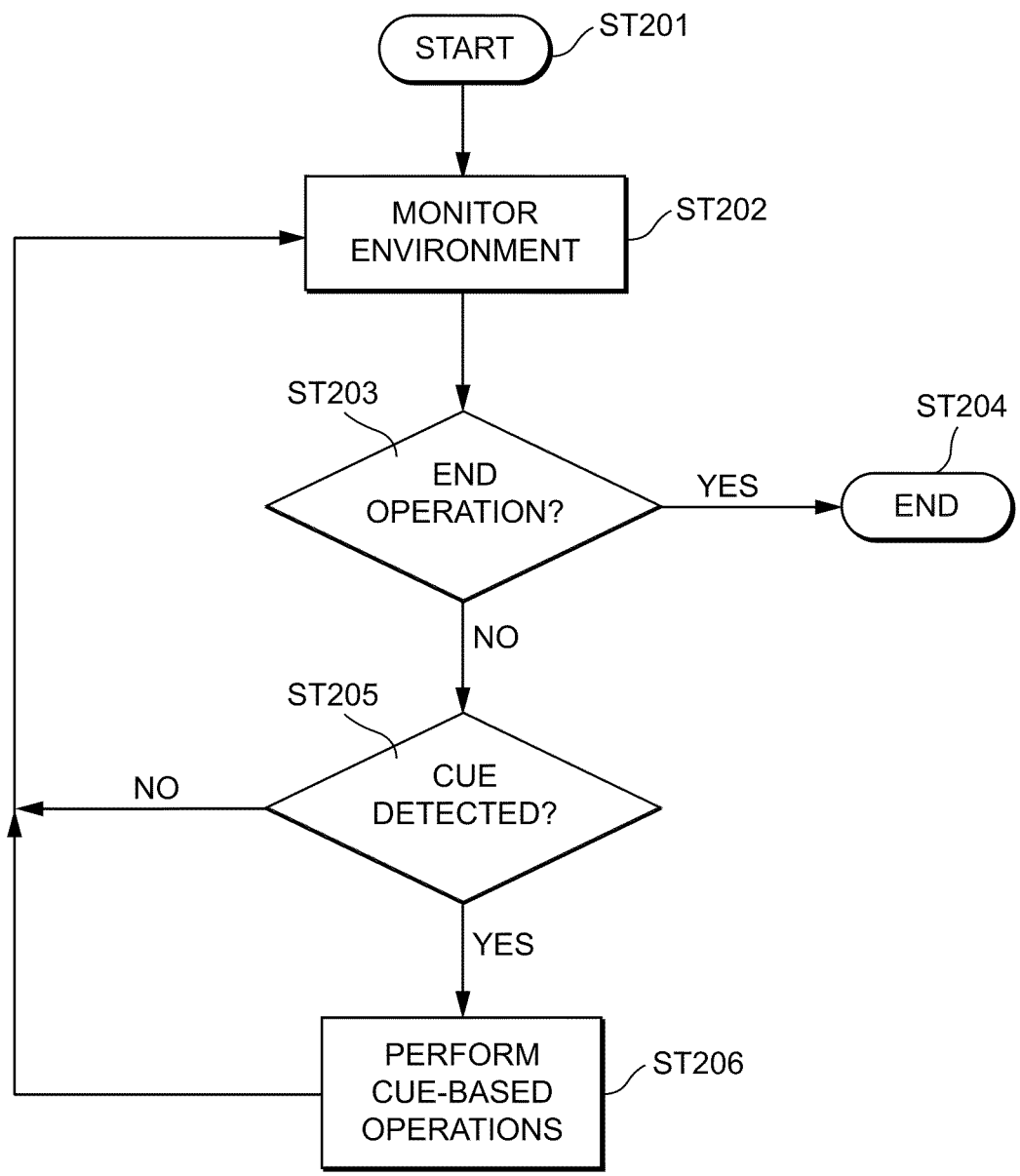
FIG. 2 shows a generalized flow diagram illustrating steps performed by an example program, application, applet, routing, subroutine, etc. in accordance with the systems and methods described herein.

FIG. 2 shows a generalized flow diagram illustrating steps performed by an example program, application, applet, routing, subroutine, etc. in accordance with the systems and methods described herein.

At ST 201, the cue detection operation is initiated. The operation may be initiated after the system 100 is started in response to an input supplied to system 100 (for example, by a user) or may be automatically initiated when system the system is started or booted-up. In this latter case, a user may designate the cue detection operation in a preferences menu as a start-up operation to be started when the system is booted-up.

At ST 202, the ambient environment or surroundings are monitored, for example, using receiver 102. As noted above, the monitoring may include monitoring the output of speakers for electronic equipment such as televisions, radios, stereo equipment, in-store announcement systems and the like. In the case of televisions, the speakers may output sound from a movie, program or commercial which is shown on a television channel or from a movie or program being played back from a storage medium such as a DVD. In the case of stereo equipment, the speakers may output sound from a song, commercial or program playing on a tuned radio channel or a song or program being played back from a storage medium as in the case of CD's or MP3 or AAC music files. In the case of in-store announcement systems, the speakers may output sound corresponding to announcements relating to the store, product sales, or store hours or corresponding to background music.

The monitoring may also include monitoring for detection of RFID tag information which may include, for example, a product identification code.

At ST 203, a determination is made as to whether an input is received for ending the cue detection operation. This input may, for example, be supplied by a user. If no such input is detected, the operation proceeds to ST 205. If such an input is detected, the operation proceeds to ST 204, where the operation ends.

At ST 205, a determination is made as to whether a cue is detected. In the case of audible cues, this detection may include, for example, whether certain tone sequences are detected. If these certain sequences are detected, they are treated as a detected cue. In the case of RFID tag information, if certain tag information is detected for longer than a specified period of time (e.g., 10 seconds or 20 seconds), that tag information is treated as a detected cue. If no cue is detected, the operation returns to the monitoring at ST 202. If a cue is detected, the operation proceeds to ST 206.

At ST 206, one or more cue-based operation(s) is/are performed. For example, the detected cue may be used to identify corresponding web site information and this web site information may be used access a web page for display to a user. In another example, data corresponding to the detected cue may simply be stored in memory for use at a later time. For example, cues stored in memory can be used to generate a list of web sites from which one or more selections may be made to access those web sites. In another example, the detected cue can cause an alert to be generated. The alert can be indicative of a detected cue or of accessing a web page based on the detected cue.

The above-mentioned operations are not mutually exclusive in that one or more of accessing a web site, storing data corresponding to the detected cue and generating an alert may be performed.

After ST 206, the process returns to the monitoring at ST 202.

The cues may be respectively associated with web page information such as a web page address or a uniform resource locator. This association may be established through a database or table stored locally in memory of system 100 or stored remotely from system 100 and accessible to the system for example over a network such as the internet. In the case of a remotely stored database, the detected cue may cause system 100 to access a website storing the database to retrieve web page information corresponding to the cue. In the case of a locally stored table in memory 106, such a table may be downloaded periodically to the system either in response to an input from a user to initiate such action or automatically at predetermined intervals, e.g., once every day, once every week, etc.

FIG. 3 shows an example table which relates audio cues to web site information. In this example, cue 1 corresponds to the webpage <<http://www.greatestcarever.com>>; cue 2 corresponds to the webpage <<http://greatest cleanerever.com>>; etc. Processor 112 determines the web page to access using the detected cue and the table of FIG. 3. A similar, separate table may be used for relating RFID tag information to web site information or the information may be combined into one table.

Audio cues may be inserted into the audio portions of television programs, commercials, movies, songs, and the like. These audio cues may, for example, be of relatively short duration (e.g., up to several seconds) and at a frequency which is high enough or low enough to not significantly interfere with the user's viewing of a television program or commercial or with the user's enjoyment of a song playing on the radio (e.g., in the lower or higher ends of the audio frequency range which extends from about 20 Hz to about 20 kHz), but which can still be detected by a microphone. Of course, it is also possible to use audio tones intended to be heard by a user as audio cues as may be the case if processor 112 is programmed to treat the first notes (tones) of a jingle associated with a product or service as a cue.

Cues may be periodically inserted into the audio portion of a movie, television program, song, or commercial and may vary in accordance with the content of the movie, program, song, or commercial. Thus a first cue in a commercial for an automobile may correspond to a web site or web page providing additional information about the automobile and a different, second cue in a subsequent commercial for a computer product may correspond to a different web site or web page providing information about the computer product.

RFID tag information may include a product type code, a unique product identifier and other information. Any of these pieces may itself be used as a cue or the cue may include a combination of one or more these information pieces. The RF tag information may include specific cue identifier information identifying the RF tag information as a type of RF tag information that should be detected as a cue. Processor 112 would detect this cue identifier information and treat the RF tag as a cue.

FIG. 4A shows one example of an audio cue which comprises a sequence of one or more tones designated as 401-1 to 401-n. Processor 112 may be programmed as a tone detector to detect one or more of such tone sequences as being cue(s).

FIG. 4B shows another example of an audio cue which comprises a sequence of multiple tones 403-1 to 403-n, one or more of which function as a header H indicating that the tone or tones which follow the header constitute a cue. By way of illustration, a sequence of two or three tones may be used as a header and processor 112 may be programmed as a tone detector that detects the header and treats the sequence of tones following the header as being a cue.

FIG. 4C shows an example of an RFID tag information as a cue. Generally speaking, an RFID tag includes an integrated circuit and an antenna. The tag detects signals from an RFID reader and returns a signal which may include information such as a product type code 405, a unique product identification code 407 and/or other information 409. Processor 102 may be programmed to detect certain codes as cues or to detect tag information which is received for a certain period of time as being a cue.

Figure 5:
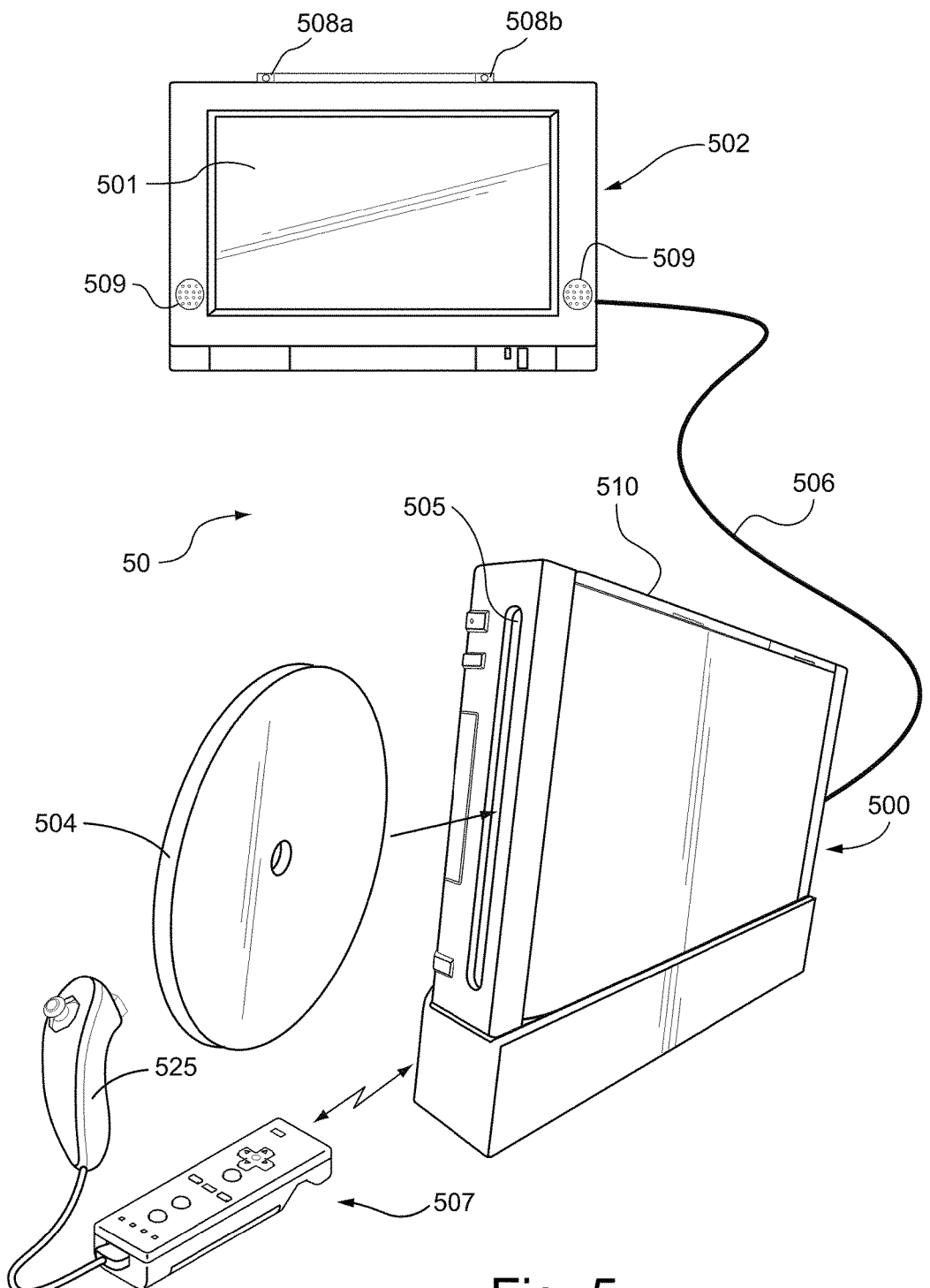
FIG. 5 shows an example game system 50 with which the systems and methods described herein can be used.

FIG. 5 shows a non-limiting example game system 50 in which the systems and methods for cue detection described herein may be used. As shown in FIG. 5, example game system 50 includes a game console 500, a television 502 and a controller 507.

Game console 500 executes a game program(s) or other software application(s) stored on optical disc 504 inserted into a slot 505 formed in housing 510 thereof. The result of the execution of the game program or other application is displayed on display screen 501 of television 502 to which game console 500 is connected by cable 506. Audio associated with the game program or other application is output via speakers 509 of television 502. While an optical disk is shown in FIG. 5, the game program or other application may alternatively or additionally be stored on other removable or non-removable storage media such as semiconductor memories, magneto-optical memories, magnetic memories and the like.

Controller 507 wirelessly transmits data such as game control data to the game console 500. The game control data may be generated using an operation section of controller 507 having, for example, a plurality of operation buttons, a key, a stick and the like. Controller 507 may also wirelessly receive data transmitted from game console 500. Any one of various wireless protocols such as Bluetooth (registered trademark) may be used for the wireless transmissions between controller 507 and game console 500.

A "nunchuk" controller 525 may be connected to controller 507. Although a wired connection is shown in FIG. 5 between controller 507 and nunchuk controller 525, alternatively, a wireless connection may be used. Nunchuk controller 525 may be held in the user's "other" hand (i.e., the hand not holding controller 507) and provides additional game control data to video game console 500.

Controller 507 also includes an imaging information calculation section (not shown) for capturing and processing images from light-emitting devices 508a and 508b. Although markers 508a and 508b are shown in FIG. 5 as being above television 500, they may also be positioned below television 500. In one implementation, a center point between light-emitting devices 508a and 508b is substantially aligned with a vertical center-line of display screen 501. The images from light-emitting devices 508a and 508b can be used to determine a direction in which controller 507 is pointing as well as a distance of controller 507 from display screen 501. By way of example without limitation, light-emitting devices 508a and 508b may be implemented as two LED modules (hereinafter, referred to as "markers") provided in the vicinity of the display screen of television 502. The markers each output infrared light and the imaging information calculation section of controller 507 detects the light output from the LED modules to determine a direction in which controller 507 is pointing and a distance of controller 507 from display 501 as mentioned above. Additional details of the imaging operation may be found in U.S. Patent Publication No. 2007-0066394 A1; U.S. Patent Publication No. 2007-0072674 A1; and U.S. Patent Publication No. 2007-0060228 A1. The entire contents of each of these applications are expressly incorporated herein.

Controller 507 also preferably includes accelerometers and/or gyroscopes. For example, controller 507 may include a three-axis, linear acceleration sensor that detects linear acceleration in three directions, e.g., the up/down direction, the left/right direction, and the forward/backward direction. Linear accelerometers are only capable of detecting acceleration along a straight line corresponding to each axis of the acceleration sensor. In other words, the direct output of the acceleration sensor is limited to signals indicative of linear acceleration (static or dynamic) along each of the axes thereof. As a result, the acceleration sensor cannot directly detect movement along a non-linear (e.g. arcuate) path, rotation, rotational movement, angular displacement, tilt, position, attitude or any other physical characteristic. However, through additional processing of the linear acceleration signals output from the acceleration sensor, additional information relating to controller 507 can be inferred or calculated (determined). For example, by detecting static, linear acceleration (i.e., gravity), the linear acceleration output of the acceleration sensor can be used to determine tilt of the controller relative to the gravity vector by correlating tilt angles with detected linear acceleration. In this way, the acceleration sensor can be used in combination with a micro-computer (not shown) of controller 507 (or another processor such as a processor of the video game console 500) to determine tilt, attitude or position of controller 507. Similarly, various movements and/or positions of controller 507 can be calculated through processing of the linear acceleration signals generated by the acceleration sensor when controller 507 containing the acceleration sensor is subjected to dynamic accelerations by, for example, the hand of a user.

Gyroscopes can be used in addition to, or in place of, the acceleration sensor for calculating movements and positions of the controller.

Figure 6:
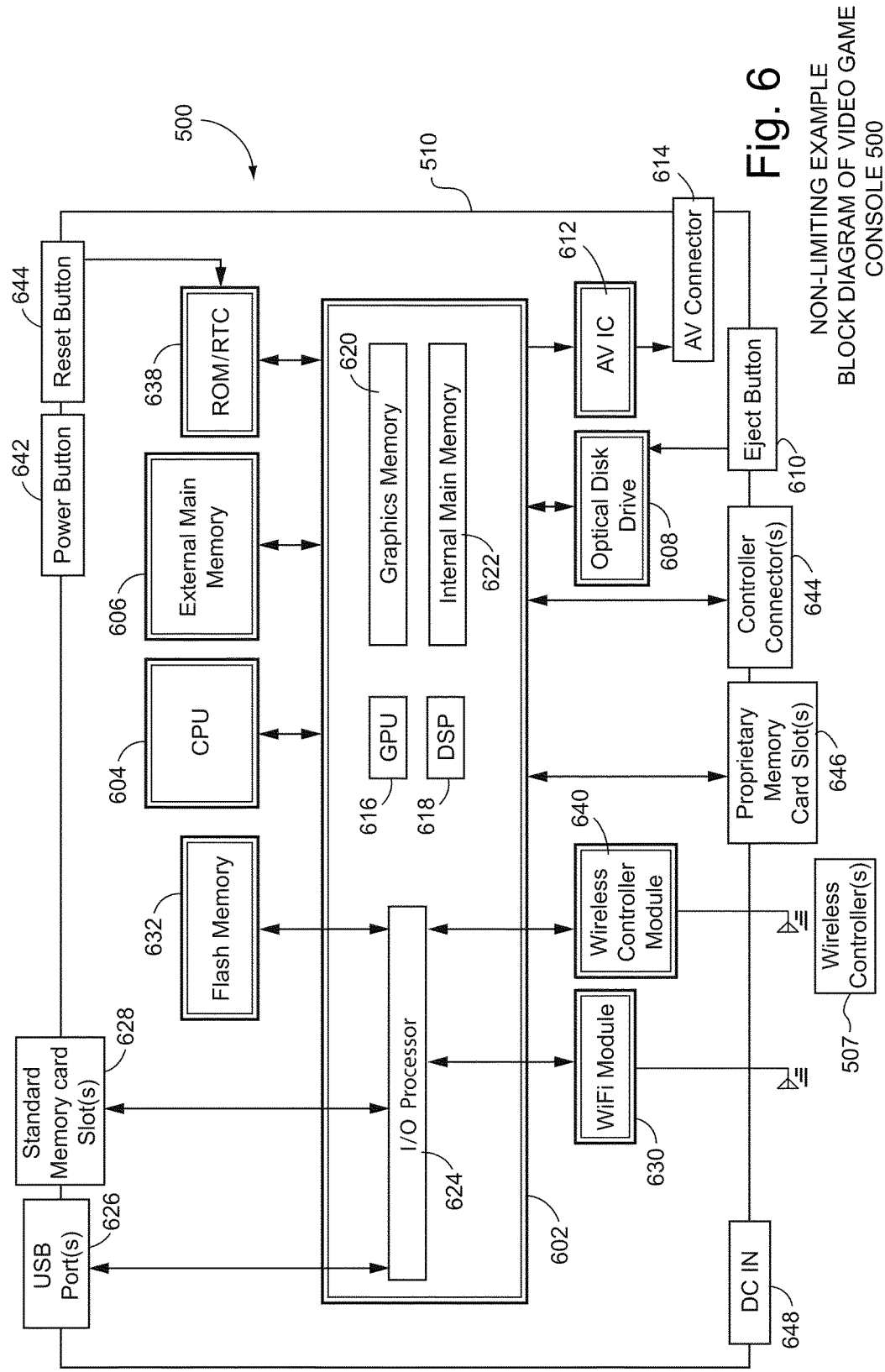
FIG. 6 is a detailed block diagram showing the components of example game system 50 of FIG. 5.

With reference to the block diagram of FIG. 6, game console 500 includes a RISC central processing unit (CPU) 604 for executing various types of software applications including (but not limited to) video game programs. CPU 604 executes a boot program stored, for example, in a boot ROM to initialize game console 500. CPU 604 can also execute a software application (or applications) stored on optical disc 504, which is inserted in optical disk drive 608, or in some other memory accessible to CPU 604. User-accessible eject button 610 provided on housing 510 of game console 500 may be used to eject an optical disk from disk drive 608.

CPU 604 is connected to system LSI 602 that includes graphics processing unit (GPU) 616 with an associated graphics memory 620, audio digital signal processor (DSP) 618, internal main memory 622 and input/output (IO) processor 624.

IO processor 624 of system LSI 602 is connected to one or more USB ports 626, one or more standard memory card slots (connectors) 628, WiFi module 630, flash memory 632 and wireless controller module 640.

USB ports 626 are used to connect a wide variety of external devices to game console 500. These devices include by way of example without limitation game controllers, keyboards, storage devices such as external hard-disk drives, printers, speakers, microphones, digital cameras, and the like. USB ports 626 may also be used for wired network (e.g., LAN) connections. In one example implementation, two USB ports 626 are provided.

Standard memory card slots (connectors) 628 are adapted to receive industry-standard-type memory cards (e.g., SD memory cards). In one example implementation, one memory card slot 628 is provided. These memory cards are generally used as data carriers but of course this use is provided by way of illustration, not limitation. For example, a player may store game data for a particular game on a memory card and bring the memory card to a friend's house to play the game on the friend's game console. The memory cards may also be used to transfer data between the game console and personal computers, digital cameras, and the like. Content such as photos and music contained on memory cards inserted into slot 628 may be accessed via the user interface of the console for output, for example, using the display screen 501 and speakers 509 of television 502.

WiFi module 630 enables game console 500 to be connected to a wireless access point. The access point may provide internet connectivity for online gaming with players at other locations (with or without voice chat capabilities), as well as web browsing, e-mail, software downloads (including downloads of game software and other applications) and many other types of online activities. In some implementations, WiFi module 630 may also be used for communication with other game devices such as suitably-equipped hand-held game devices. Module 630 is referred to herein as "WiFi", which is generally a designation used in connection with the family of IEEE 802.11 specifications. However, game console 500 may of course alternatively or additionally use wireless modules that conform to other wireless standards.

Flash memory 632 stores, by way of example without limitation, game save data, system files, internal applications for the console and downloaded data (such as games).

Wireless controller module 640 receives signals wirelessly transmitted from one or more controllers 507 and provides these received signals to IO processor 624. The signals transmitted by controller 507 to wireless controller module 640 may include signals generated by controller 507 itself as well as signals generated by other devices such as nunchuk controller 525 that may be connected to controller 507. Of course, in other implementations, nunchuk controller 525 may directly communicate signals (by wire or wirelessly) to wireless controller module 640 of console 500. As mentioned above, the communications may use the Bluetooth protocol.

Wireless controller module 640 may also wirelessly transmit signals to controller 507. By way of example without limitation, controller 507 (and/or another game controller such as nunchuk controller 525 connected thereto) may be provided with vibration circuitry and vibration circuitry control signals may be sent via wireless controller module 640 to control the vibration circuitry (e.g., by turning the vibration circuitry on and off). By way of further example without limitation, controller 507 may be provided with (or be connected to) a speaker (not shown) and audio signals for output from this speaker may be wirelessly communicated to controller 507 via wireless controller module 640. By way of still further example without limitation, controller 507 may be provided with (or be connected to) a display device (not shown) and display signals for output from this display device may be wirelessly communicated to controller 507 via wireless controller module 640. It will be appreciated that wireless controller module 640 can communicate signals to nunchuk 525 either directly or via controller 507. By way of still further example, controller 507 may be provided with (or connected to) a microphone which detects cues as described herein.

Proprietary memory card slots 646 are adapted to receive proprietary memory cards. In one example implementation, two such slots are provided. These proprietary memory cards have some non-standard feature(s) such as a non-standard connector and/or a non-standard memory architecture. For example, one or more of the memory card slots 646 may be adapted to receive memory cards used with the Nintendo GameCube platform. In this case, memory cards inserted in such slots can transfer data from games developed for the GameCube platform. In an example implementation, memory card slots 646 may be used for read-only access to the memory cards inserted therein and limitations may be placed on whether data on these memory cards can be copied or transferred to other storage media such as standard memory cards inserted into slots 628.

One or more controller connectors 644 are adapted for wired connection to respective game controllers. In one example implementation, four such connectors are provided for wired connection to game controllers for the Nintendo GameCube platform. Alternatively, respective wireless receivers may be connected to connectors 644 to receive signals from wireless game controllers. These connectors enable players, among other things, to use controllers for the Nintendo GameCube platform when an optical disk for a game developed for this platform is inserted into optical disk drive 608.

A connector 648 is provided for connecting game console 500 to DC power derived, for example, from an ordinary wall outlet. Of course, the power may be derived from one or more batteries.

GPU 616 performs image processing based on instructions from CPU 604. GPU 616 includes, for example, circuitry for performing calculations necessary for displaying three-dimensional (3D) graphics. GPU 616 performs image processing using graphics memory 620 dedicated for image processing and a part of internal main memory 622. GPU 616 generates image data for output to television 502 by audio/video connector 614 via audio/video IC (interface) 612.

Audio DSP 618 performs audio processing based on instructions from CPU 604. The audio generated by audio DSP 618 is output to television 502 by audio/video connector 614 via audio/video IC 612.

External main memory 606 and internal main memory 622 are storage areas directly accessible by CPU 604. For example, these memories can store an application program such as a game program or other software application, applet, script, etc. read from optical disc 504 by the CPU 604, a game program or other application, applet, script, etc. read from flash memory 632 by CPU 604, various types of data and the like.

ROM/RTC 638 includes a real-time clock and preferably runs off of an internal battery (not shown) so as to be usable even if no external power is supplied. ROM/RTC 638 also may include a boot ROM and SRAM usable by the console.

Power button 642 is used to power game console 500 on and off. In one example implementation, power button 642 must be depressed for a specified time (e.g., one or two seconds) to turn the console off so as to reduce the possibility of inadvertently turn-off. Reset button 644 is used to reset (re-boot) game console 500.

Figure 7:
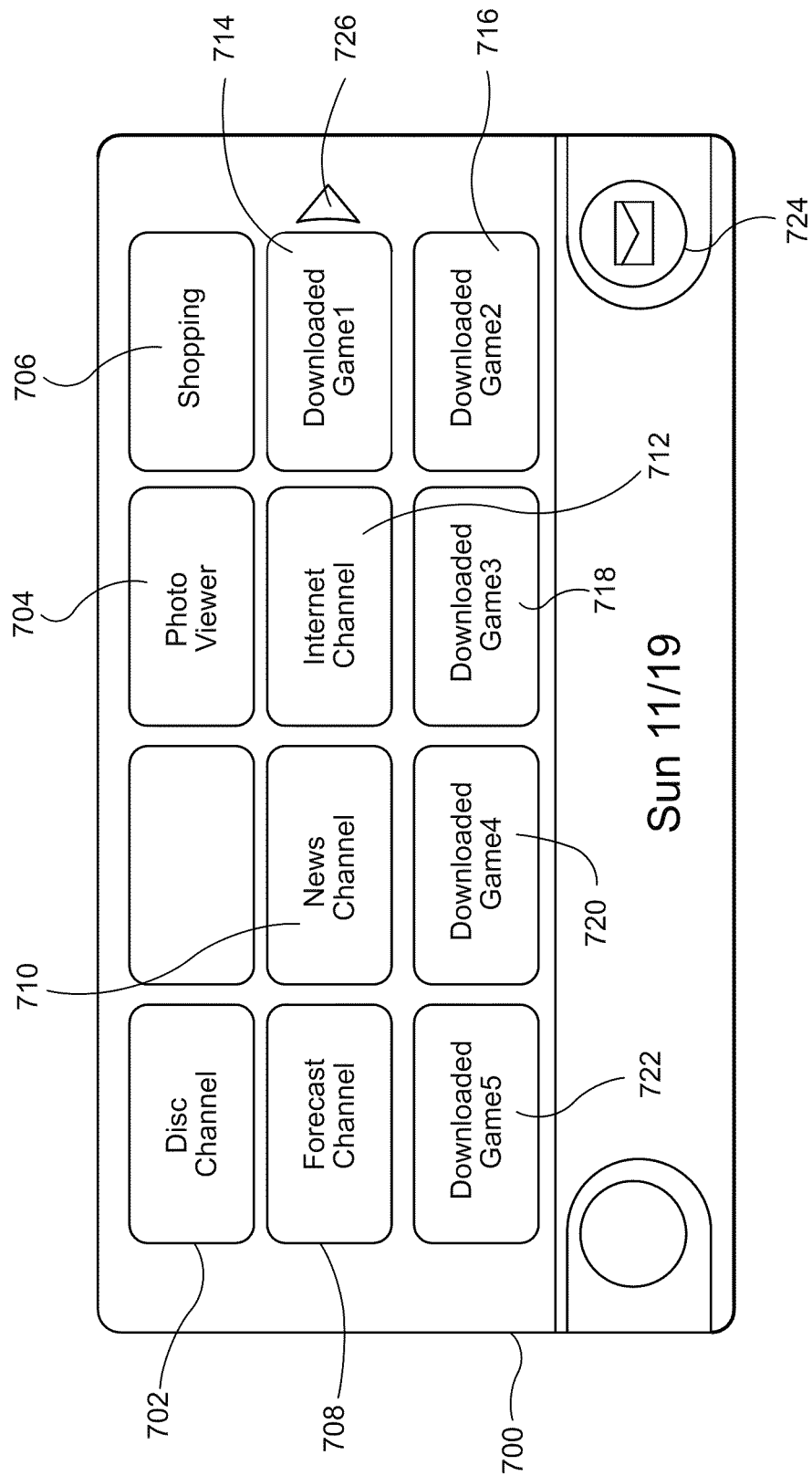
FIG. 7 shows an example user interface for game system 50.

FIG. 7 shows an example user interface for game system 50. In particular, FIG. 7 shows a menu 700 which is generated by game console 500 for display on television 502. This menu is a channel menu that is displayed on television screen 501 and allows users to select one of a plurality of different "channels" for accessing various features of game console 500. The channel selection input and other selection inputs may be provided by positioning an onscreen cursor using the optical position detection feature of controller 507 and then pressing a "select" button or trigger of remote control 507. Of course, other techniques for making selections may be used and the systems and methods described herein are not limited in this respect.

While the channels shown in FIG. 7 contain textual channel descriptions, other content such as images, graphics, video and/or sound may also be associated with some or all of the channels on the channel menu.

By way of example and without limitation, a disc channel 702 allows users to play discs inserted in optical disc drive 608. As noted above, the inserted disc may contain games or other software applications.

A photo viewer channel 374 allows users to retrieve digital pictures from a memory card inserted into standard memory card slot(s) 628 of video game console 500 and display them on television screen 501.

A shopping channel 706 allows users to shop for items, which may be either free or may require payment. These shopping items may include, but are not limited to, video games or other software applications which may be downloaded from a server to console 500 for storage, for example, in flash memory 632. After users download games or software applications using shopping channel 706, each downloaded game or application can, if desired, appear in the channel menu of FIG. 7 as its own channel. To play the downloaded game or to execute the downloaded application, users simply select the corresponding channel. In FIG. 7, channels 714, 716, 718, 720 and 722 correspond to channels for downloaded games.

A forecast channel 708 allows users to access and display local weather forecasts (e.g., retrieved from the Internet) after turning on video game console 500. The weather information can be automatically updated by accessing the Internet.

A news channel 710 allows users to access and display local, national and world news (e.g., retrieved from the Internet), which may be organized into a variety of topical categories. The news can be automatically updated by accessing the Internet.

An internet channel 712 allows the user to access the internet to, for example, access web sites using a browser running on console 500.

Right arrow 726 may be selected to move to a different page of the channel menu. A left arrow (not shown) may be present and is selectable when there are pages to the left of the current page. Game console 500 may, if desired, be programmed to limit the channel menu to only displaying up to a certain maximum number of channels (e.g., up to five pages each having twelve channels). This limitation is not a storage capacity issue, but rather a user interface management issue.

The channel menu may also contain a menu bar that provides information such as time/date and includes other selection items such as an email icon 724 for launching an email application.

In one example arrangement shown in FIG. 8, a microphone 802 is attached to the USB port 626 and receives audio output emitted by speakers (such as speakers 509 or 804) connected to electronic equipment in the vicinity of console 500. A cue which is detected in the received audio is processed by CPU 604 of console 500 and causes a browser associated with the Internet channel 712 to access a web site corresponding to the cue.

CPU 604 also causes an alert to be provided to the user by, for example, sending a vibration control command to controller 507 via wireless module 640 to cause vibration circuitry in controller 507 to vibrate, providing an alert to the user that a web page is being loaded in the Internet channel. Other alerts may be given including flashing lights (not shown) arranged on the housing 510 of console 500 or lights arranged on controller 507.

Generally speaking, the cue detection process is active when game console 500 is in a standby state, i.e., when the console is not being otherwise used to play a game or execute some application. Of course, in instances where the cues are embedded in audio of the game itself, for example, the cue detection process may be active while a game is played. Detecting audio cues in game play may unlock additional game levels, allow use of new tools and weapons, and the like.

If system 100 (see FIG. 1) is implemented as a handheld device (such as a mobile telephone), it can collect cues as it is carried by around by a user 902 as generally shown in FIG. 9. A specific example of a handheld device which may be used to collect cues is a handheld game system described in application Ser. No. 11/111,985, filed Apr. 22, 2005. The contents of application Ser. No. 11/111,985 are incorporated herein in their entirety.

For example, system 100 (which is shown in FIG. 9 in the form of a mobile telephone) may detect cues from audio played over speakers in stores in which the system is carried. If configured with an RF tag reader (which may be either built-into the system or provided as an add-on), the system may also detect cues from RFID tags (such as tag 904) attached to products (such as television 906) in the vicinity of system 100 as it is carried. If the handheld system is connected to the internet (e.g., via a Wi-Fi or cellular network), these cues may cause a webpage to be loaded as discussed above. Alternatively, the collected cues may be uploaded to a console system like console 500 (e.g., via wireless module 640) which can then provide the user a list of web sites that can be accessed based on the collected cues.

If desired, cues can be filtered so that only those cues likely to result in presenting information of interest to the user actually result in loading a web page. This filtering may be based on user preferences or on a user's profile. By way of example, For example, if a user's profile indicates that the user is male, cues corresponding to women's apparel can be ignored.

As discussed above, the various systems, methods, and techniques described herein may be implemented in digital electronic circuitry, computer hardware, firmware, software, or in combinations of these elements. Apparatus embodying these techniques may include appropriate input and output devices, a computer processor, and a computer program product tangibly embodied in a non-transitory machine-readable storage device for execution by a programmable processor. A process embodying these techniques may be performed by a programmable processor executing a suitable program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language or in assembly or machine language, if desired; and in any case, the language may be a compiled or interpreted language. Suitable processors include, by way of example, both general and special purpose microprocessors. Generally, a processor will receive instructions and data from a read-only memory and/or a random access memory. Non-transitory storage devices suitable for tangibly embodying computer program instructions and data include all forms of computer memory including, but not limited to, non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

The processing system/circuitry described in this specification is "programmed" to control processes in accordance with the "logic" described in the specification. One of ordinary skill in the art will therefore recognize that, for example, a processing system including at least one CPU when executing instructions in accordance this logic operates as "programmed logic circuitry" to perform the operations defined by the logic.

While certain example systems and methods have been described herein, it is to be understood that the appended claims are not to be limited to the systems and methods disclosed, but on the contrary, are intended to cover various modifications and equivalent arrangements included within the spirit and scope of the appended claims.

I claim:

1. A method of accessing web pages using a portable device carried by a user, the method comprising:
   detecting a plurality of cues using the portable device including a cue detector while the portable device is carried by the user, wherein each of the cues comprises a radio frequency identification (RFID) number;
   storing, in a memory of the portable device, data indicative of the detected cues by updating cue information in the memory when each of the cues is detected;
   determining, by the portable device, web addresses based on the stored data; and
   connecting, by the portable device, to one or more web pages using the web addresses,
   wherein each of the cues comprises an identifier,
   wherein the storing includes storing a plurality of identifiers from the detected cues, and wherein the determining web addresses comprises:
      subsequent to the storing, displaying information associated with each of the stored identifiers to a user;
      selecting at least one of the stored identifiers in accordance with an input by the user; and
      determining at least one of the web addresses based upon the selected at least one of the stored identifiers,
   wherein the displaying information associated with each of the stored identifiers comprises:
      ordering the plurality of identifiers in accordance with an amount of time the user was in proximity to each of the identifiers; and
      displaying the information in accordance with the ordered plurality of identifiers.

2. The method according to claim 1, wherein each of the cues is attached to a product, and wherein the displayed information comprises product information for each said product.

3. The method according to claim 1, wherein the displaying is on a display of the portable device.

4. The method according to claim 1, wherein the displaying is on a display of another device in communication with the portable device.

5. The method according to claim 1, further comprising generating an alert upon said detecting.

6. The method according to claim 1, further comprising enabling online purchasing products associated with one or more of the displayed identifiers.

7. The method according to claim 1, wherein said detecting comprises detecting each of said detected cues for at least a specified time.

8. The method according to claim 1, wherein each of the cues comprises a product type code and a unique product identifier.

9. The method according to claim 1, wherein each of the cues comprises cue identifying information identifying the RFID number as a type of RFID information to be detected as a cue, and wherein the method further comprising determining whether the detected cue includes said cue identifying information.

10. The method according to claim 1, wherein the detecting is performed while the portable device is in a standby mode.

11. The method according to claim 1, further comprising causing web pages associated with the detected cues to be displayed in response to each of the cues being detected as the portable device is being carried.

12. The method according to claim 1, further comprising filtering the identifiers in accordance with a user interest profile to select identifiers for displaying.

13. The method according to claim 1, wherein the portable device is a game device.

* * * * *